United States Patent
Turner et al.

(10) Patent No.: US 8,162,122 B2
(45) Date of Patent: Apr. 24, 2012

(54) DRIVE DISCONNECT DEVICE

(75) Inventors: James Andrew Turner, Hemel Hempstead (GB); Darren Christopher Howard, Aylesbury (GB)

(73) Assignee: Goodrich Control Systems, Solihull (GB)

( * ) Notice: Subject to any disclaimer, the term of this patent is extended or adjusted under 35 U.S.C. 154(b) by 606 days.

(21) Appl. No.: 12/390,777

(22) Filed: Feb. 23, 2009

(65) Prior Publication Data
US 2009/0223774 A1 Sep. 10, 2009

(30) Foreign Application Priority Data
Mar. 5, 2008 (GB) .................................. 0804123.8

(51) Int. Cl.
F16D 11/04 (2006.01)
H02K 7/10 (2006.01)

(52) U.S. Cl. .................. 192/101; 192/69.2; 192/114 R; 290/1 A (58) Field of Classification Search ................. 192/69.2, 192/101
See application file for complete search history.

(56) References Cited

U.S. PATENT DOCUMENTS

| 4,167,695 A * | 9/1979 | Phillips ........................... 322/12 |
| 4,734,590 A * | 3/1988 | Fluegel ........................... 290/1 C |
| 7,296,670 B2 * | 11/2007 | Howard et al. ............... 192/144 |

FOREIGN PATENT DOCUMENTS

| EP | 1 548 311 A2 | 6/2005 |
| EP | 1 602 845 A2 | 12/2005 |

OTHER PUBLICATIONS

Search Report dated May 25, 2009 from European Patent Application No. EP 09153004.

* cited by examiner

Primary Examiner — Richard M. Lorence
(74) Attorney, Agent, or Firm — Wolf, Greenfield & Sacks, P.C.

(57) ABSTRACT

A drive disconnect device for releasably connecting an electrical generator to a drive shaft, the drive disconnect device comprising an output shaft and at least one drive transfer element movable from a first position where it drivingly connects the drive shaft and the output shaft to a second position where the driving connection is removed, wherein operation of the disconnect device causes the electrical generator to become electrically isolated or excitation for the generator to be inhibited.

19 Claims, 9 Drawing Sheets

DRIVE DISCONNECT DEVICE

FIELD OF THE INVENTION

The present invention relates to a drive disconnect device. Such a device is suitable for controllably disconnecting a driven shaft from a drive shaft. The drive disconnect device is especially suited for the controlled disconnection of a generator from a prime mover.

DESCRIPTION OF PRIOR ART

EP 1548311 discloses a drive disconnect device in which an input shaft is connected to an output shaft via a coaxially disposed linearly translatable drive transfer element. The drive transfer element is in splined engagement with the output shaft and engages with the input shaft via a plurality of drive dogs. The drive transfer element is biased into engagement with the input shaft via a compression spring.

A release element is disposed around the drive transfer element and is biased by a further, and stronger, compression spring to bear against a flange of the drive transfer element and push it out of engagement with the input shaft. In normal use the release element is held in an "armed" position via a spring loaded pin which is itself held in engagement with the release element by a solenoid. When it is desired to disconnect the driving connection between the input and output shafts the solenoid is operated, and thus the pin is moved under the action of the spring to disengage from the release element. This then allows the release element to move in response to the force provided by the further compression spring into engagement with the drive transfer element and to move the drive transfer element out of driving engagement with the input shaft. This mechanism works well. However the inventors have realised that several modifications are possible to improve the operation of this mechanism.

SUMMARY OF THE INVENTION

According to a first aspect of the present invention there a drive disconnect device for releasably connecting an electrical generator to an input shaft, the drive disconnect device comprising an output shaft and at least one drive transfer element movable from a first position where it drivingly connects the input shaft and the output shaft to a second position where the driving connection is removed, wherein operation of the disconnect device causes the electrical generator to become electrically isolated or excitation for the generator to be inhibited.

The inventors have realised that the forces acting within the drive disconnect device can be reduced by ensuring that an electrical generator connected via the disconnect device is shut down or isolated. The drive disconnect device is primarily intended to connect an aeronautical generator to a prime mover, such as a gas turbine engine, such that the generator can receive motive energy from the prime mover and thereby provide a source of electrical power. Causing the generator to electrically shut down or its operation to be inhibited while a rotor of the generator is still turning significantly reduces the torque that has to be transmitted through the drive disconnect device to the generator. This in turn reduces the contact forces between load bearing surfaces and hence reduces the friction between those surfaces. This means that weight savings become possible because the forces that need to be provided by, for example, bias springs to supply sufficient force to ensure operation of the disconnect device become reduced.

Advantageously a release element is held at an armed position by a lock. Preferably the release element is urged by a biasing means, for example a compression spring, to move from the armed position to a release position where it bears against the drive transfer element and moves the drive transfer element to the second position thereof such that the driving connection between the input shaft and the electrical generator is removed. Advantageously movement of the lock or the release element causes a supply of exciter current to the generator to be interrupted thereby taking the generator offline.

Preferably the lock includes a detent which engages with a co-operating portion of the release element. Advantageously walls that define the sides of the co-operating portion of the release element, and of the detent, are inclined with respect to the direction of motion of the release element when it moves from the armed position to the release position. This gives rise to a component of force which acts to urge the detent out of engagement with the release element. This is advantageous because frictional forces between the detent and the release element may act to inhibit removal of the detent from the release element. By carefully selecting the angle of inclination of the surfaces between the detent and, for example, a co-operating groove within the release element into which the detent engages, then the frictional forces can be partially or fully compensated for by the camming action set up between the detent and the groove within the release element.

Preferably the release element has a elongate toothed region formed thereon which forms a rack gear which, in use, can co-operate with a pinion gear such that rotation of the pinion gear can move the release element between the released and armed positions. This is advantageous because the release element may co-operate with a strong compression spring in order to ensure that when the lock is released the release element can bear against the drive transfer element with sufficient force to cause the drive transfer element to disconnect the drive between the input and output shafts. However it is desirable to be able to reset the drive disconnect device easily. The rack and pinion gear arrangement enables service personnel to provide sufficient force to overcome the action of the compression spring and thereby return the release element to its armed position.

The rack and pinion gear could also be used as a release mechanism as the pinion gear could be held against rotation until such time as it was desired to operate the drive disconnect device. Furthermore, in further variations the rack and pinion could be driven in order to force the release element to move the drive transfer device to the drive disconnect position in the event of compression spring failure or even if the compression spring was deliberately omitted.

The release element is held against rotation but, during operation of the disconnect device, bears against the drive transfer element which rotates with the input and output shafts whilst the drive disconnect device transfers drive from the input shaft to the output shaft.

Advantageously the drive transfer element is in splined engagement with the output shaft such that it rapidly stops rotating once the driving connection between the input shaft and the output shaft has been removed. However, it can be seen that there is a small period of time when the release element bears against the drive transfer element and there is relative rotation therebetween. Low friction coatings can be used between these elements when it is expected that such relative motion will occur infrequently. However, with a move to in-service testing the inventors realised that it would be advantageous for the interface between the release element and the drive transfer element to be formed by a bearing.

However it is especially advantageous for opposing sides of each ball bearing within a bearing race to extend from the bearing race such that the bearings themselves bear against the drive transfer element and the release element.

BRIEF DESCRIPTION OF THE DRAWINGS

The present invention will further be described, by way of example only, with reference to the accompanying drawings, in which.

DESCRIPTION OF PREFERRED
EMBODIMENTS OF THE INVENTION

Figure 1:
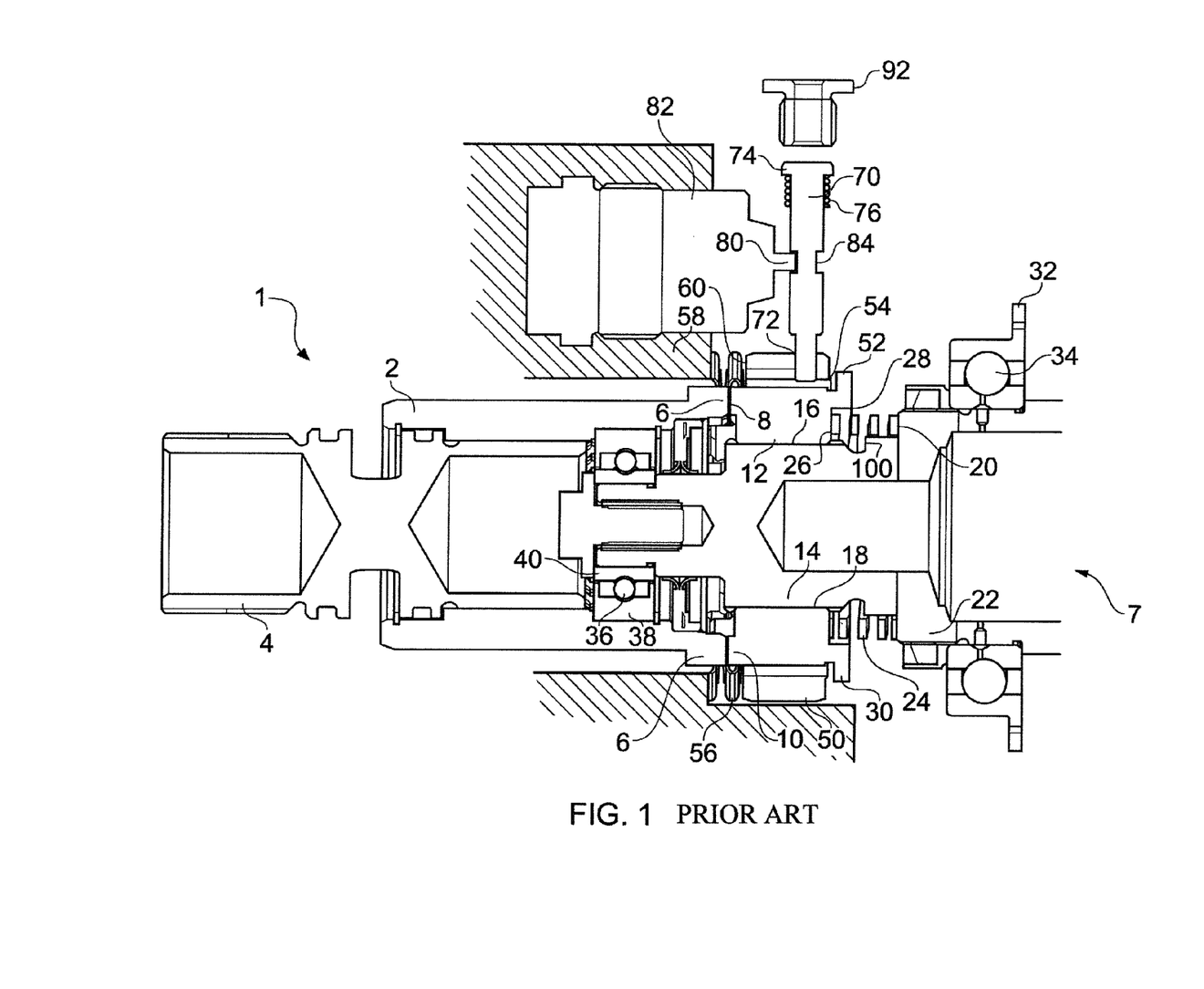
FIG. 1 is a cross section through a drive disconnect device as disclosed in EP 1548311 when at the drive transfer position to which improvements constituting embodiments of the present invention are applied.

FIG. 1 illustrates a drive disconnect device, generally designated 1. The drive disconnect device is disclosed in EP 1548311 but will be subject to various modifications as will be described hereinafter. The drive disconnect device has an input shaft 2 which is in splined engagement with a quill shaft 4 which is driven from a prime mover (not shown) such as an aircraft engine. The input shaft 2 has, at a first end 6 thereof remote from the quill shaft 4, a castellated end face which forms drive dogs 6. A disconnect device can be used to supply motive power to an aeronautical generator 7 (partly shown). The disconnect device also allows the generator to be removed from driving engagement with the prime mover in the event of a generator malfunction.

The drive dogs 6 are releasably engageable with co-operating dogs 8 provided at a first end 10 of an annular drive transfer element 12. The drive transfer element 12 is coaxially disposed around an output shaft 14. The drive dogs may be slightly angled with respect to the axis of rotation at the input shaft such that torque transfer in a predetermined direction of rotation (direction of drive from the prime mover) gently urges the drive transfer element and the input element into engagement with one another. However, such profiling must be carefully done in order to ensure that such urging does not inhibit the operation of the disconnect device. In a preferred embodiment the drive dogs are not angled with respect to the axis of rotation.

The drive transfer element 12 also carries a plurality of axial splines 16 around an inner surface thereof. The splines 16 engage with co-operating splines 18 situated around an outer circumference of an output shaft 14. The splines 16 and 18 are arranged such that the drive transfer element 12 can be axially displaced with respect to the output shaft 14 whilst being held against rotation with respect to the output shaft 14.

The output shaft 14 has (in this embodiment) an annular shoulder 20 formed on a region 22 of increased diameter at a second end thereof. One end of a helical compression spring 24 may bear against the shoulder and the other end of the spring 24 abuts a face 26 within an annular recess 28 at the second end of the drive transfer element 12. The spring 24 is coaxially disposed around part of the output shaft 14 and is arranged such that the drive transfer element 12 is urged towards the input shaft 2 such that the drive dogs 6 and 8 tend towards the engaged positions. Thus the spring 24 acts to maintain the drive transfer element 12 at its first position such that torque is transferred from the input shaft 2 to the output shaft 14 via the drive dogs 6 and 8, the drive transfer element 12 and the splines 16 and 18.

The relative positions of the compression springs and the splines 16 and 18 may be varied, as will be shown later.

The splines 16 and 18 may also be slightly angled with respect to the axis of the disconnect device such that torque transfer to the generator gently urges the drive transfer element 12 towards the input shaft 2 so as to further urge the drive dogs 6 and 8 into engagement. In a preferred embodiment the splines are parallel to the axis of the disconnect device.

The output shaft is rotatably supported with respect to a stator or housing 32 by bearings 34. Similarly the input shaft 2 is rotatably supported around the output shaft 14 by a bearing 36 disposed between bearing races 38 and 40.

The drive disconnect device 1 also includes an annular release element 50 coaxially disposed around part of the drive transfer element 12 but spaced apart therefore such that it does not contact the element 12 when the release element 50 is in an "armed" position as illustrated in FIG. 1. This is important as it gives a long service life to the disconnect mechanism as there is no wear between the release element 50 and the drive transfer element 12 when the release element is at the "armed position". The drive transfer element has an annular flange 52, presenting a face perpendicular to the axis of rotation, on the opposite end to the drive dog 6. The flange extends radially past the innermost portion of the release element 50. Thus there is some radial overlap between the release element 50 and the flange 52. An end portion 54 of the release element 50 can be brought to bear against the flange 52 either directly, but more preferably via a bearing race as will be described later.

A spring 56 such as a "crest to crest" spring is disposed concentrically around the input shaft 4 and extends between a non-rotating support 58, which may be part of the housing for the disconnect device, and an end face 60 of the annular release element 50. The spring 56 is maintained in compression such that it urges the release element 50 towards the flange 52 of the drive transfer element 12. The release element 50 is slideably mounted within the drive disconnect device 1 such that it can slide axially. However it is held in place by a release pin 70 which engages in a hole or recess 72 in the release element 50. The release pin 70 includes an enlarged head 74 against which a spring 76 acts to urge the release pin out of engagement with the release element 50.

Although the spring 76 acts to urge the end of the pin 70 out of the hole 72 in the release element 50, the release pin 70 is held in place, as shown in FIG. 1, by a projection 80 attached to the armature of, or otherwise moved by, a solenoid 82 which is maintained in a position where it is inserted into an annular groove 74 in pin 70. Thus the projection 80 prevents the pin 70 from moving out of the hole 72 under the force of the spring 76.

Figure 2:
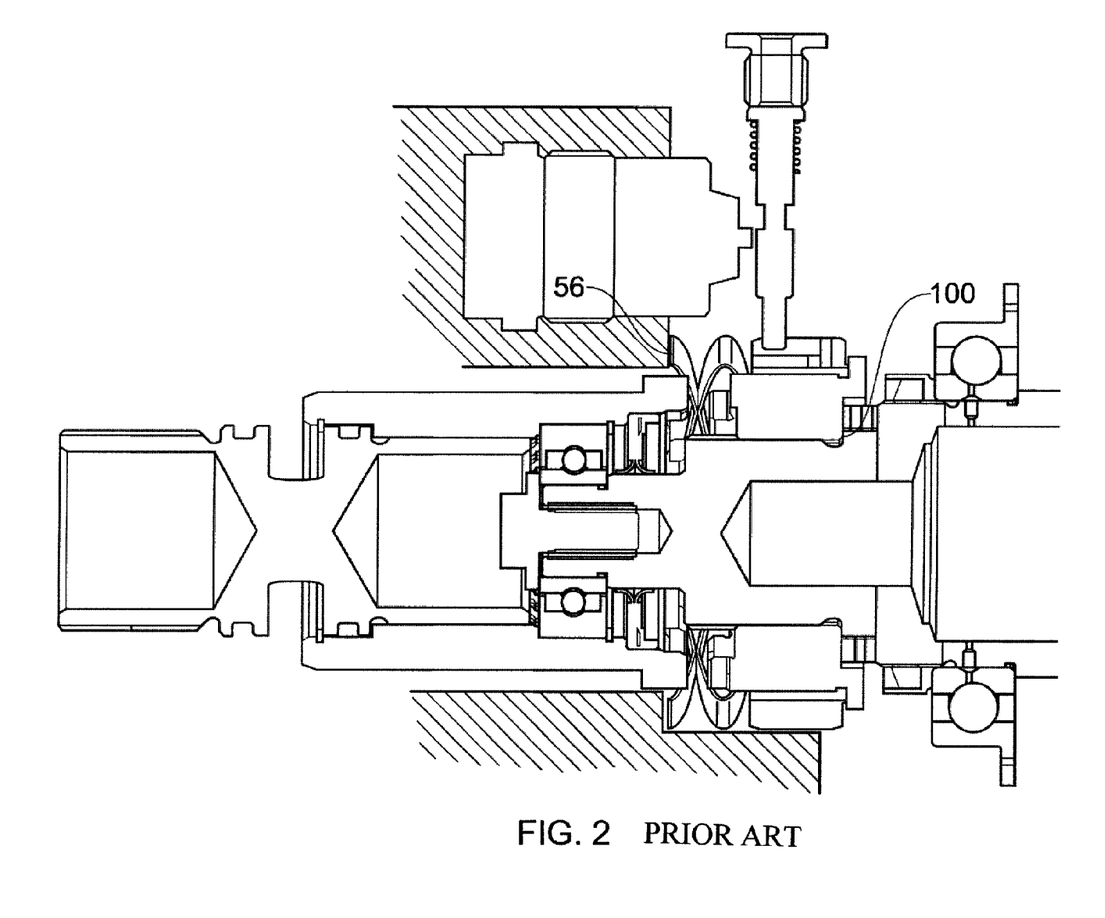
FIG. 2 shows the device of FIG. 1 when at the drive disconnect position.

When the solenoid 82 is activated, the projection 80 moves away from the release pin 70. The pin 70 then becomes free to move with respect to the release element 50 thereby allowing the release element 50 to be moved in response to the force exerted by the spring 56. The drive transfer device is shown at its drive disconnect position in FIG. 2. The solenoid 82 and the pin 70 form a lock that releasably holds the release element 50 in the armed position.

Figure 5:
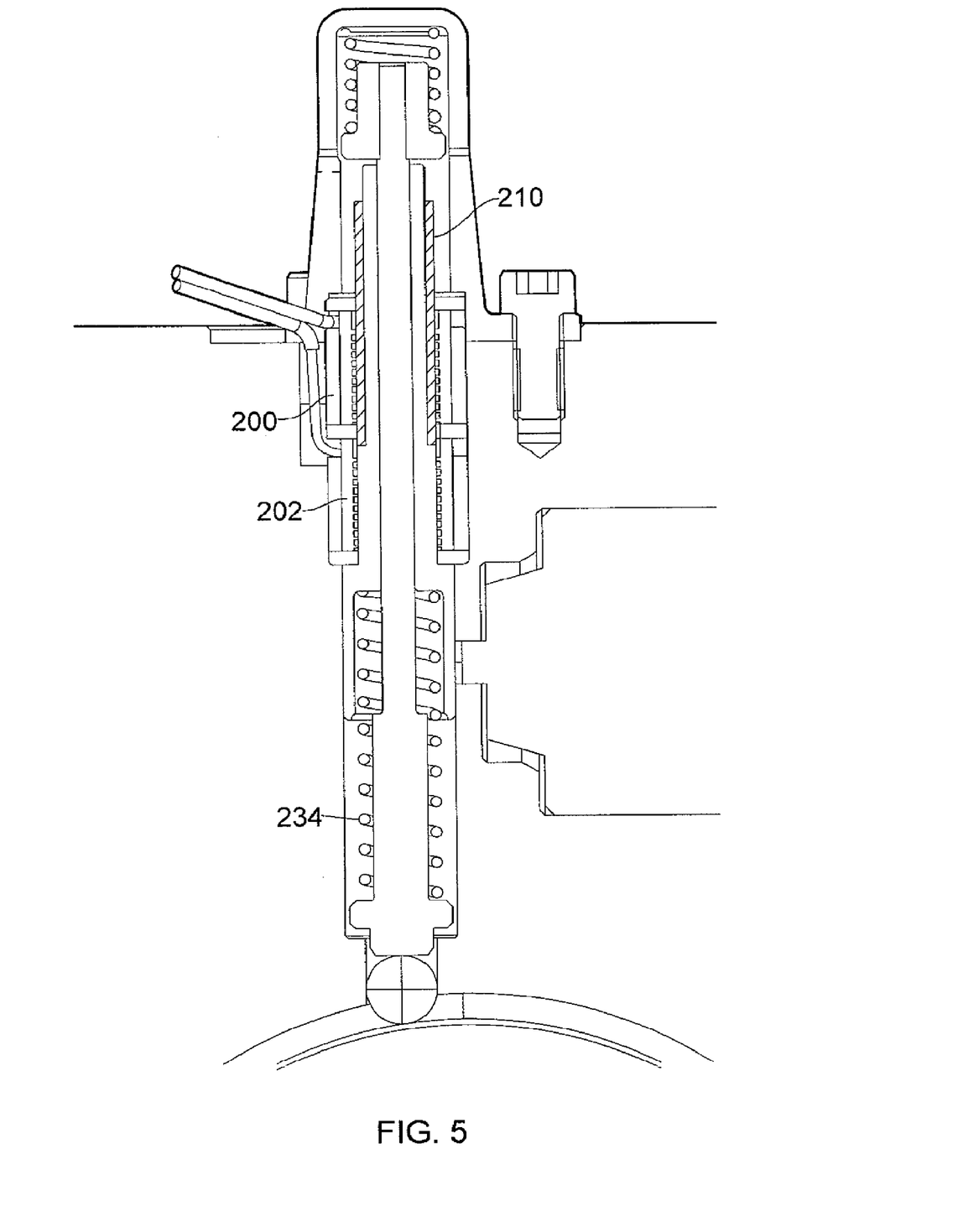
FIG. 5 illustrates the release pin and the associated switch at an electrical disconnect but mechanical lock position.

In an embodiment of the present invention the release element 50 may have a axial groove (FIG. 5*a*) in its outer surface in which a further projection extends into so as to prevent the release element from undergoing rotation.

The inventors realised that, with the generator online, considerable torque might be transmitted through the drive disconnect device, and consequently the forces acting between the dogs 6 and 8 might be considerable. This gives rise to large frictional forces, which may be exacerbated if, as mentioned before, the dog faces are slightly angled to urge them towards one another under load. The inventors have realised that these forces could be much reduced if the generator was taken off line as part of the disconnect process. It would, of course, be possible to issue a command to the generator controller to take the generator off line, but this requires modification of the generator controller which may be undesirable.

Figure 3:
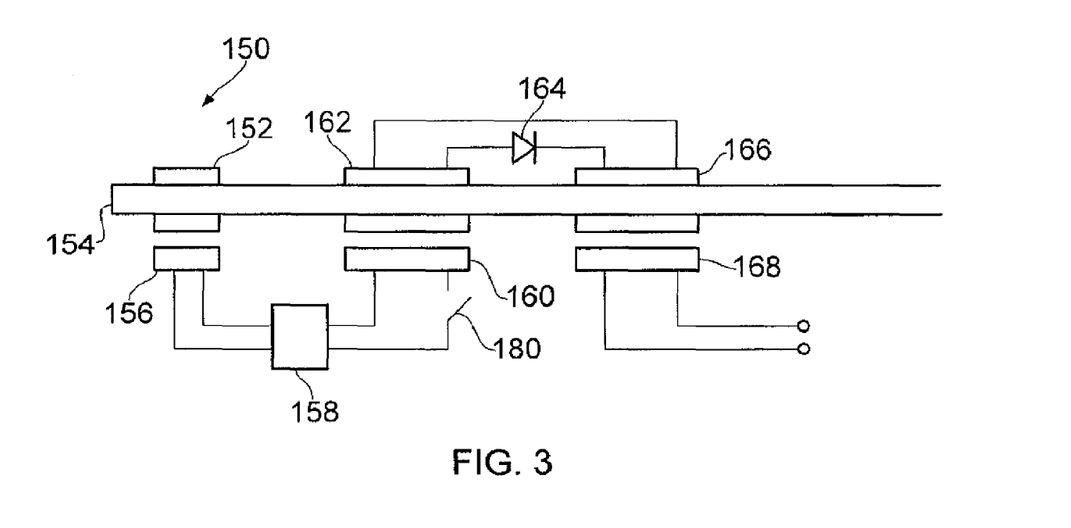
FIG. 3 illustrates, in simplified format, the electrical circuit associated with the generator, and showing the disconnect switch constituting an embodiment of the invention formed in association with the improved release pin.

FIG. 3 schematically shows, in very simplified format, a typical electrical configuration of a three stage generator. The generator comprises a permanent magnet exciter 150 which is formed from a permanent magnet 152 which is attached to the rotor 154 of the generator which co-operates with a stator winding 156 to generate a current which can be modulated by a generator controller 158 to control the output from the generator. The current from the permanent magnet exciter and generator controller is then provided to a stator exciter winding 160 which generates a magnetic field which interacts with an exciter rotor winding 162 to induce current therein. This current is rectified by a rectifier 164 and then used to energise a main generator rotor winding 166. This winding generates a magnetic field which rotates with the rotor and thereby cuts the main generator stator windings 168 thereby inducing electrical power therein which forms the generator output. The advantage of this generator configuration, which is well known, is that there are no slipping contacts. In an embodiment of the present invention, a further switch 180 is interposed in the path between the permanent magnet exciter portion and the exciter winding 160. This switch 180 may be formed as part of the release pin, as will be described hereinafter, or alternatively could be fabricated on the release element 50.

Figure 4:
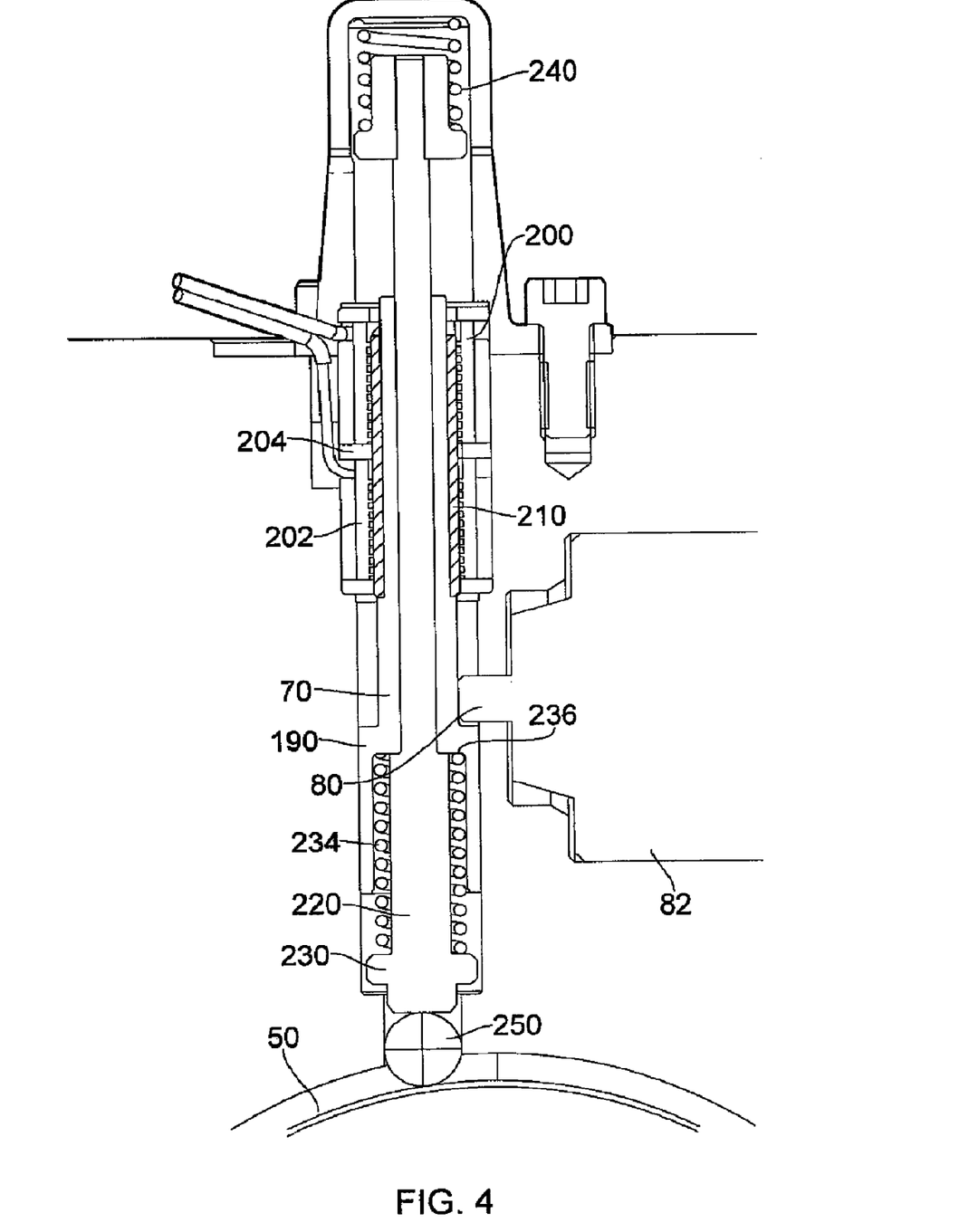
FIG. 4 shows the release pin when at the locked position.
Figure 6:
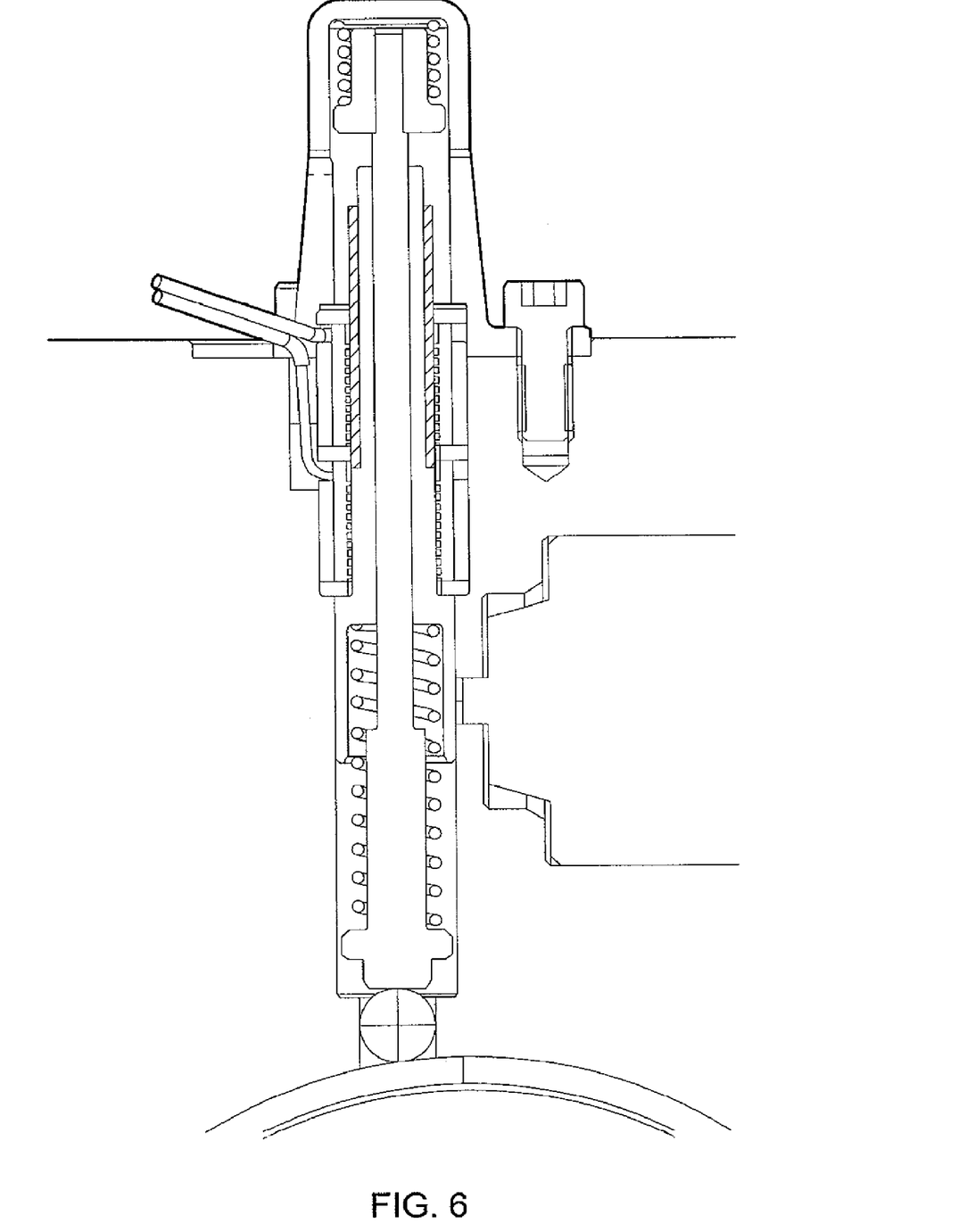
FIG. 6 illustrates the release pin at the fully released position.

FIGS. 4 to 6 show the release pin 70 and the solenoid 82 in greater detail. The pin 70 is modified such that electrical input from the generator controller is provided to a first annular contact 200, whereas a further annular contact 202 provides a connection to the generator exciter winding. The contacts are spaced apart by an insulating region 204 so that they cannot touch one another. The pin 70 carries a cylindrical sliding contact 210 which engages with the contacts 200 and 202 such that electrical power can be provided from the generator controller to the exciter winding when the pin 70 is in the locking position as shown in FIG. 4. The pin 70 is of a two part construction and comprises an outer sleeve portion 190 coaxially disposed around a central rod 220. The sleeve 190 has a recess which engages with the pin 80 of the solenoid 82. The rod portion 220 carries an enlarged head 230. A compression spring 234 extends between the enlarged head 230 and a shoulder 236 formed in the sleeve 190 so as to urge the head 230 towards the release element 50 whilst simultaneously urging the sleeve 190 away from the release element 50. This motion is normally inhibited by the pin 80 of the solenoid 82. A further compression spring 240 may also be provided to urge the shaft 220 to move towards the release element 50. It can be seen that in this two part pin design the sliding contact 210 is carried by the sleeve 190.

When it is desired to operate the disconnect device, the solenoid 82 is energised so as to retract the pin 80. This immediately allows the sleeve 190 to move under the urging of the compression spring 234, to a position, as shown in FIG. 5 where the annular conductor 210 no longer makes electrical contact between the contacts 200 and 202. As a result, the supply of power to the exciter stator winding is inhibited and consequently the generator goes off line. Thus the torque being transmitted through the drive disconnect device is significantly reduced.

Figure 7:
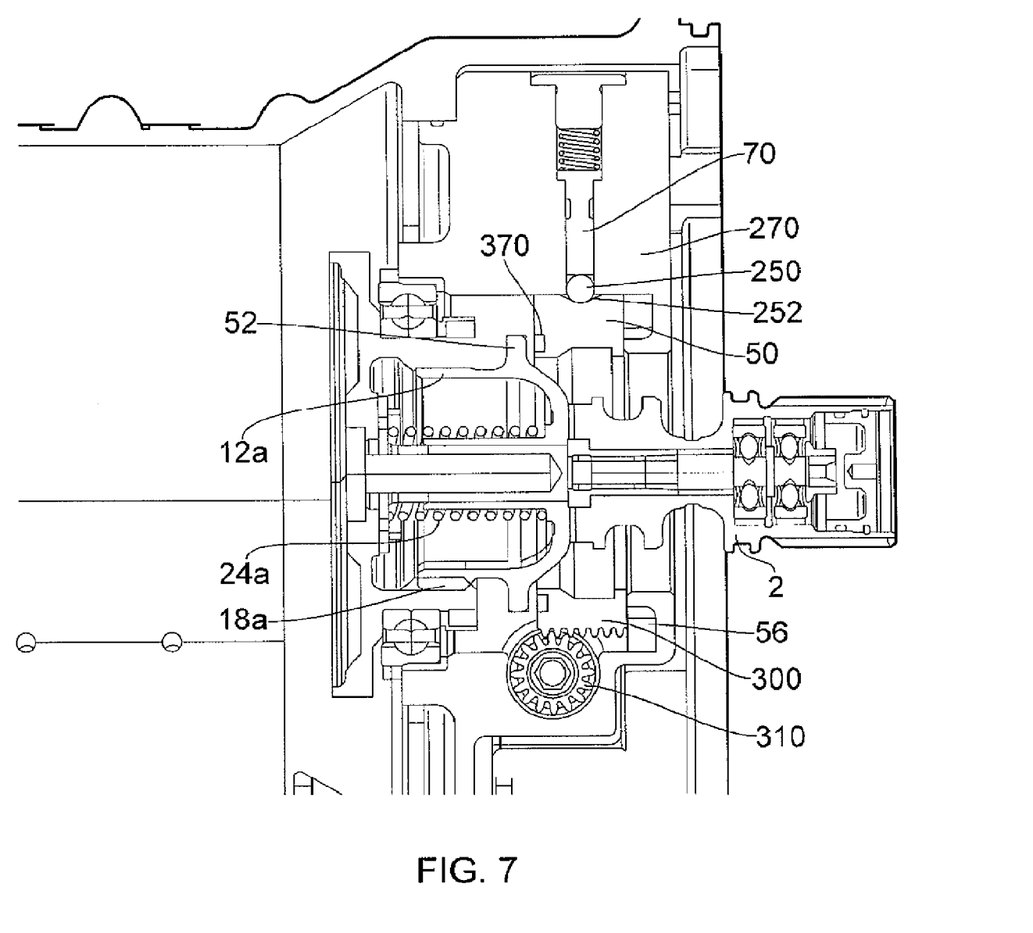
FIG. 7 shows the rack and pinion arrangement associated with the release element in a drive transfer device constituting a further embodiment of the invention.

Returning to FIG. 4, a further modification compared to the arrangement shown in EP 1548311 is to profile the interface between the release element 50 and the release pin mechanism. This could be done, for example, by shaping the end 220 of the pin 70, but in a preferred embodiment a suitably sized ball bearing 250 is used as a detent to engage within an annular groove in the release element 50 and also to engage in a channel formed in the housing associated with the release pin 70. Thus, as shown in FIG. 4, the ball bearing 250 locks the release element 50 in position with respect to the housing. This is also shown in FIG. 7 which shows a modified variant of the drive disconnect device. It is to be noted that FIG. 7 has the positions of the input and output shafts reversed compared to FIG. 1. Thus it can be regarded as being viewed from the other side compared to FIG. 1. Referring to FIG. 7, the release pin 70 is shown in simplified form compared to the more detailed arrangement shown in FIGS. 4 to 6, but it can be seen that the pin sits inside a housing 270 and that the ball bearing 250 engages with the housing 270 and also with a dished recess 252 in the release element 50. As the pin 70 releases, the action of the compression spring 56 is to attempt to move the release element 50 into engagement with the flange 52 of the drive transfer element 12. The gently sloped profile of the dished portion 252 (which may be part of a groove) causes the ball bearing 250 to be urged radially outward (upwardly shown in FIGS. 4, 5, 6 and 7) out of engagement with the release element 50 such that, as shown in FIG. 6, the release element becomes fully released to move from the armed position thereby urging the drive transfer element to move such that the dogs thereon no longer drivingly engage with the dogs on the input shaft.

The arrangement shown in FIG. 7 has two further modifications compared to that shown in FIG. 1. In a first modification the drive transfer element is formed as a bell housing 12*a* with the compression spring 24 of FIG. 1 being provided as an internally housed compression spring 24*a*. Furthermore, the splines connecting the drive transfer element to the output shaft are now disposed on an outwardly facing wall of the drive transfer element 12*a* and designated 18*a*. However it will be seen that functionally, this device operates in the same way as that disclosed in FIG. 1. A further modification is the provision of a rack gear 300 along a portion of the release element 50. The rack gear 300 engages with a pinion gear 310 such that rotation of the pinion 300 can be used to drive the release element 50 to translate axially against the urging of the compression spring 56 so as to return the release element to its armed position. This facilitates manual testing and reset of the drive disconnect device by service personnel. The pinion can be driven by a removable handle, or indeed by a spanner or a socket set.

As noted earlier, during operation of the drive disconnect device, the non-rotating release element engages with a flange of the drive transfer element which, by definition, is rotating whilst transferring drive from the input shaft to the output shaft. In order to facilitate this engagement a bearing cage is carried by the interface of the release element, as schematically illustrated by item 370 in FIG. 7 and as shown in greater detail in FIGS. 8*a* to 8*d*.

Figure 8A:
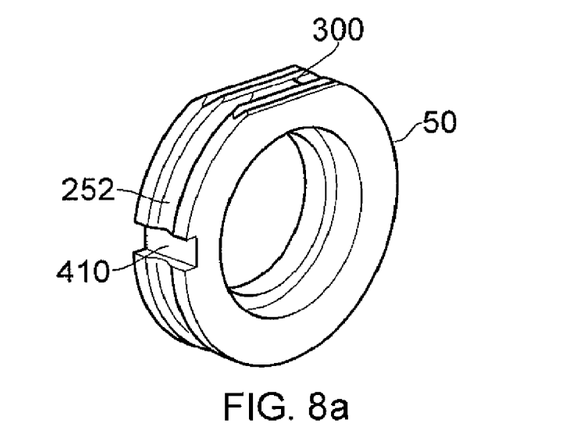
FIGS. 8a to 8d show the bearings and bearing cage in greater detail.
Figure 8B:
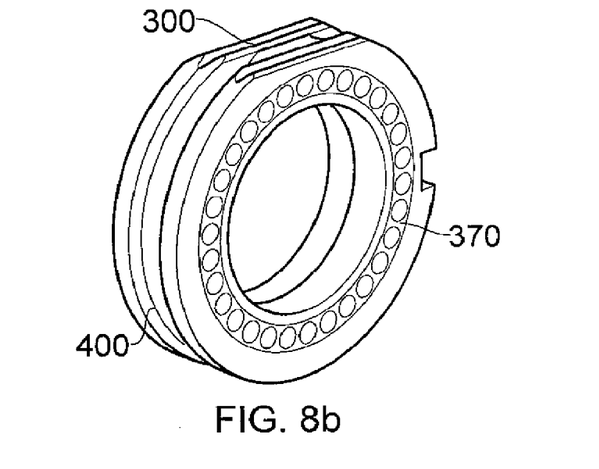
Figure 8C:
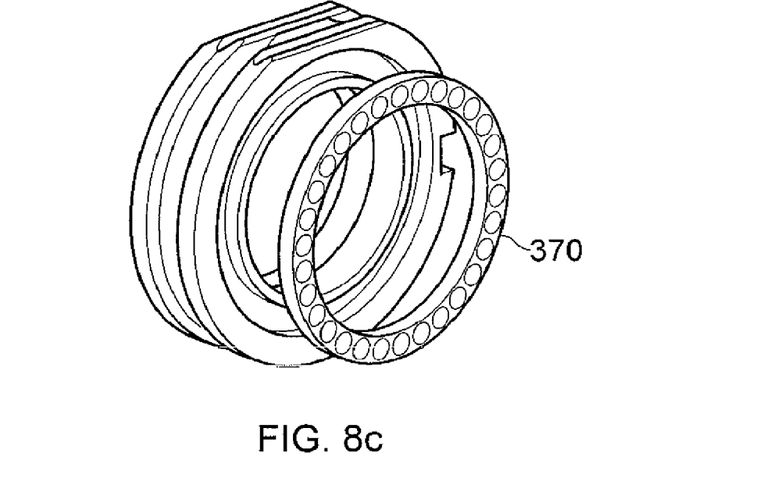
Figure 8D:
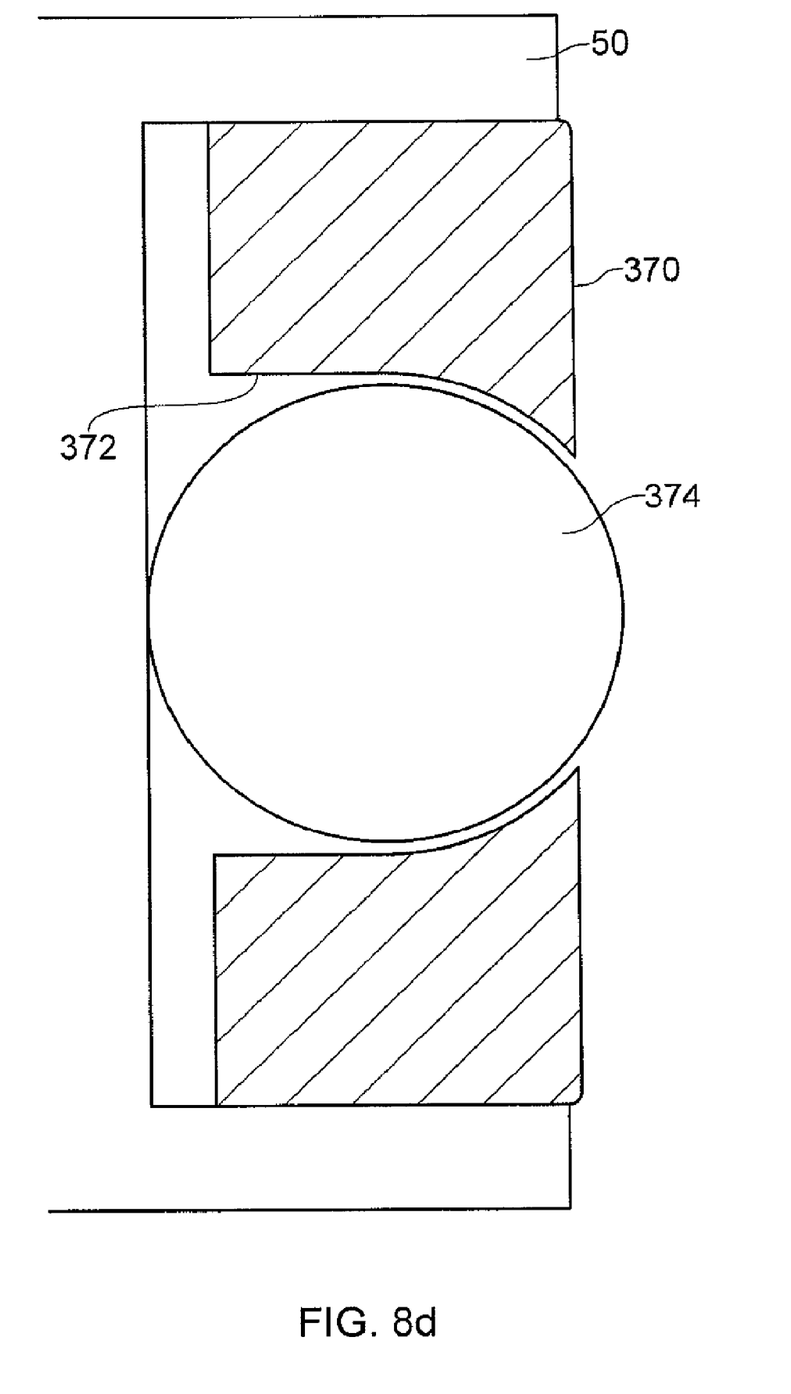

FIG. 8*a* shows the release element 50 in greater detail as described hereinbefore the release element 50 includes the rack gear 300, a dished profile 252 which can in fact be provided as an annular groove 400 and an anti-rotation key way slot 410 to hold the release element against rotation. An end face, which, in use, faces towards the drive disconnect element has an annular slot formed therein which, in use, accepts a bearing cage 370. The bearing cage is shown in position in FIG. 8*b* and separated from its retaining slot in FIG. 8*c*. As shown in greater detail in FIG. 8*d*, the bearing cage 370 has a series of recesses 372 formed therein which hold ball bearings in a generally bell shaped enclosure such that the ball bearing 374 cannot escape from the outwardly facing side. The bearings, may for example, be 7 mm diameter bearings protruding from a 6 mm width cage. The bearings are relatively low mass and hence can achieve the high rotational speeds required to interface between the non-rotating release element and the rotating drive disconnect element at the onset of the disconnect operation very rapidly. As can be seen from FIG. 8*c* a large number of bearings, say 20 to 40, may be used.

It is thus possible to provide an improved drive disconnect arrangement.

The invention claimed is:

1. A drive disconnect device for releasably connecting an electrical generator to an input shaft, the drive disconnect device comprising an output shaft and at least one drive transfer element movable from a first position where it drivingly connects the input shaft and the output shaft to a second position where a driving connection between the input shaft and the output shaft is removed, wherein operation of the disconnect device causes the electrical generator to become electrically isolated or excitation for the generator to be inhibited, said drive disconnect device further comprising a release element and a lock, and in which one of the release element and the lock carries electrical contacts such that the electrical generator is connectable to an external circuit when the lock holds the release element at an armed position, and the electrical generator is isolated from the external circuit or excitation is inhibited when the lock is operated to allow the release element to move from the armed position.

2. A drive disconnect device as claimed in claim 1, in which the release element is an annular sleeve having a detent receiving region, the detent receiving region having an inclined surface such that a bias force urging the release element from the armed position generates a component of force via the interaction between the detent and the detent receiving region that urges the detent out of engagement with the release element.

3. A drive disconnect device as claimed in claim 2, in which the detent is held in engagement with the release element by a release pin.

4. A drive disconnect device as claimed in claim 3, in which the motion of the release pin is inhibited by a solenoid until it is desired to operate the drive disconnect device, when the solenoid is operated so as to allow the release pin to move.

5. A drive disconnect device as claimed in claim 3, in which the release pin carries at least one electrical connect which co-operates with fixed contacts to conduct electricity when the release pin is at a first release pin position and to be out of connection with the fixed contacts when the release pin moves to a drive disconnect position.

6. A drive disconnect device as claimed in claim 5, in which the release pin comprises a sleeve disposed around a rod, the sleeve having a recess which engages with the solenoid, and a compression spring acts between the sleeve and a head portion of the rod to urge the sleeve to move to a position where excitation for the generator is inhibited.

7. A drive disconnect device as claimed in claim 1 in combination with a generator, in which electrical power is supplied to an exciter winding of the generator when the drive disconnect device is operable to transfer drive, and the supply of electrical power to the exciter is inhibited when the drive disconnect device is operated to disconnect the output shaft from the drive shaft.

8. A drive disconnect device as claimed in claim 1, in which the release element carries an elongate toothed region which acts as a rack which co-operates with a pinion gear to allow motion of the pinion gear to move the release element between the release and armed positions.

9. A drive disconnect device as claimed in claim 1, in which upon release of the lock the release element applies force to the drive transfer element to move it against the urging of a bias to the second position, and where the interface between the drive transfer element and the release element comprises a plurality of bearings extending from a carrier.

10. A drive disconnect device for releasably connecting an electrical generator to an input shaft, the drive disconnect device comprising an output shaft and at least one drive transfer element movable from a first position where it drivingly connects the input shaft and the output shaft to a second position where a driving connection between the input shaft and the output shaft is removed, wherein initiation of operation of the disconnect device causes the electrical generator to become electrically isolated or excitation for the generator to be inhibited, such that a force acting through the drive transfer element is reduced.

11. A drive disconnect device as claimed in claim 10, further comprising a release element and a lock, and in which one of the release element and the lock carries electrical contacts such that the electrical generator is connectable to an external circuit when the lock holds the release element at an armed position, and the electrical generator is isolated from the external circuit or excitation is inhibited when the lock is operated to allow the release element to move from the armed position.

12. A drive disconnect device as claimed in claim 11, in which the release element is an annular sleeve having a detent receiving region, the detent receiving region having an inclined surface such that a bias force urging the release element from the armed position generates a component of force via the interaction between the detent and the detent receiving region that urges the detent out of engagement with the release element.

13. A drive disconnect device as claimed in claim 12, in which the detent is held in engagement with the release element by a release pin.

14. A drive disconnect device as claimed in claim 13, in which the motion of the release pin is inhibited by a solenoid until it is desired to operate the drive disconnect device, when the solenoid is operated so as to allow the release pin to move.

15. A drive disconnect device as claimed in claim 13, in which the release pin carries at least one electrical connect which co-operates with fixed contacts to conduct electricity when the release pin is at a first release pin position and to be out of connection with the fixed contacts when the release pin moves to a drive disconnect position.

16. A drive disconnect device as claimed in claim 15, in which the release pin comprises a sleeve disposed around a rod, the sleeve having a recess which engages with the solenoid, and a compression spring acts between the sleeve and a head portion of the rod to urge the sleeve to move to a position where excitation for the generator is inhibited.

17. A drive disconnect device as claimed in claim 11, in which the release element carries an elongate toothed region which acts as a rack which co-operates with a pinion gear to allow motion of the pinion gear to move the release element between the release and armed positions.

18. A drive disconnect device as claimed in claim 11, in which upon release of the lock the release element applies force to the drive transfer element to move it against the urging of a bias to the second position, and where the interface between the drive transfer element and the release element comprises a plurality of bearings extending from a carrier.

19. A drive disconnect device as claimed in claim 10, in combination with a generator, in which electrical power is supplied to an exciter winding of the generator when the drive disconnect device is operable to transfer drive, and the supply of electrical power to the exciter is inhibited when the drive disconnect device is operated to disconnect the output shaft from the drive shaft.

* * * * *